M. CLARK.
Reaping and Mowing Machine.
No. 55,467. Patented June 12, 1866.
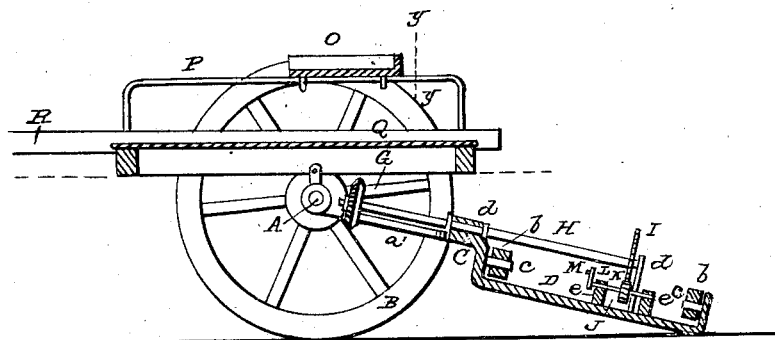
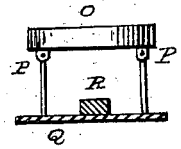
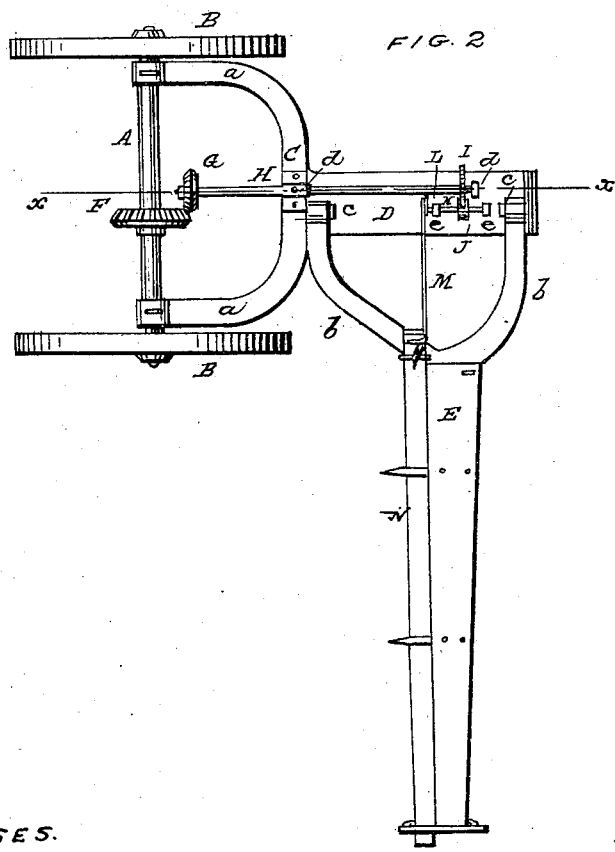
WITNESSES.
INVENTOR.

UNITED STATES PATENT OFFICE.

MORELL CLARK, OF CASTALIA, IOWA.

IMPROVEMENT IN REAPING AND MOWING MACHINES.

Specification forming part of Letters Patent No. 55,467, dated June 12, 1866.

*To all whom it may concern:*

Be it known that I, MORELL CLARK, of Castalia, in the county of Winneshiek and State of Iowa, have invented a new and useful Improvement in Reaping and Mowing Machines; and I do hereby declare that the following is a full, clear, and exact description thereof, which will enable others skilled in the art to make and use the same, reference being had to the accompanying drawings, forming part of this specification, in which—

Figure 1 is a side sectional view of my invention, taken in the line $x\ x$, Fig. 2; Fig. 2, a plan or top view of the same; Fig. 3, a transverse vertical section of a portion of the same, taken in the line $y\ y$, Fig. 1.

Similar letters of reference indicate like parts.

This invention relates to a new and improved arrangement of the sickle-driving mechanism, as hereinafter fully shown and described, whereby a reaping or mowing machine may be made to operate perfectly on uneven or rough ground, the finger-bar being allowed to rise and fall to accommodate itself to the irregularities of surface over which it may pass, the sickle always being in line with the pitman whatever position the finger-bar may assume.

A represents an axle having a wheel, B, secured on each end of it; and C is a forked bar, the prongs $a\ a$ of which are fitted closely on the axle and have their outer terminating in a flat bar, D.

E is the finger-bar, the inner end of which is forked, the prongs $b\ b$ being fitted on journals $c\ c$ at the front and rear ends of the bar D, so that the finger-bar may work freely up and down on said journals as centers.

On the rear end of the shaft H there is keyed a spur-wheel, I, which gears into a pinion, J, the shaft K of the latter having its bearings $e\ e$ on the bar D and a crank-pulley, L, at one end. This shaft K is in line with the journals $c\ c$, on which the finger-bar works, and the crank-pulley L has a pitman, M, attached, which drives the sickle N.

From this description it will be seen that the finger-bar may rise and fall to conform to the irregularities of the ground over which it may pass without at all affecting the sickle-driving mechanism, as the shaft K is in line with the journals $c\ c$, in which the finger-bar works, and the relative position of the sickle N with the crank-pulley L will be the same whatever position the finger-bar E may assume. Hence the machine will operate perfectly over uneven or rough ground.

The forked bar C, with the flat bar D at its rear end, in connection with the forked inner end of the bar connected to bar D, as shown, form a very firm, simple, and durable arrangement, admitting of the finger-bar rising at either end or rising horizontally, as the nature or character of the ground may require.

The driver's seat O is placed on two horizontal guide-rods, P P, secured to a platform, Q, which rests on the forks or prongs $a\ a$ of the bar C, directly over the axle. The draft-pole R is attached to this platform Q. The driver's seat may be adjusted farther forward or backward on these rods P P, so that the machine may always be kept in a perfectly-balanced state.

Having thus described my invention, I claim as new and desire to secure by Letters Patent—

The arrangement of forked bar C, bar D, forked finger-bar E, and journals $c\ e$, in combination with the axle A, bevel-wheels F G, shaft H, wheels I J, shaft K, crank-pulley L, pitman M, and sickle N, constructed and operating in the manner and for the purpose herein specified.

The above specification of my invention signed by me this 14th day of September, 1865.

MORELL CLARK.

Witnesses:
A. W. KRAMER,
N. C. BENNETT.